(12) United States Patent
Borse et al.

(10) Patent No.: US 11,149,136 B2
(45) Date of Patent: Oct. 19, 2021

(54) BIMODAL POLYETHYLENE

(71) Applicant: Univation Technologies, LLC, Houston, TX (US)

(72) Inventors: Nitin Borse, Freeport, TX (US); Swapnil Chandak, Freeport, TX (US); Ayush A. Bafna, Freeport, TX (US); Cliff R. Mure, Middlesex, NJ (US); Yi Zhang, Shanghai (CN); Timothy R. Lynn, Middlesex, NJ (US); Roger L. Kuhlman, Freeport, TX (US); John F. Szul, S. Charleston, WV (US)

(73) Assignee: Univation Technologies, LLC, Midland, MI (US)

( * ) Notice: Subject to any disclaimer, the term of this patent is extended or adjusted under 35 U.S.C. 154(b) by 6 days.

(21) Appl. No.: 16/348,311

(22) PCT Filed: Oct. 25, 2017

(86) PCT No.: PCT/US2017/058282
§ 371 (c)(1),
(2) Date: May 8, 2019

(87) PCT Pub. No.: WO2018/089195
PCT Pub. Date: May 17, 2018

(65) Prior Publication Data
US 2020/0071509 A1    Mar. 5, 2020

Related U.S. Application Data

(60) Provisional application No. 62/418,913, filed on Nov. 8, 2016.

(51) Int. Cl.
*C08F 210/16* (2006.01)
*C08L 23/08* (2006.01)

(52) U.S. Cl.
CPC ........ *C08L 23/0815* (2013.01); *C08F 210/16* (2013.01); *C08L 2201/08* (2013.01);
(Continued)

(58) Field of Classification Search
CPC .... C08F 10/02; C08F 210/16; C08F 2500/05; C08F 2500/13; C08F 2500/12;
(Continued)

(56) References Cited

U.S. PATENT DOCUMENTS

| 5,852,116 A | 12/1998 | Cree et al. |
| 7,250,473 B2 | 7/2007 | Schramm et al. |

(Continued)

FOREIGN PATENT DOCUMENTS

| WO | 2009/082451 A2 † | 7/2009 | |
| WO | WO 2009082451 * | 7/2009 | .............. C08F 10/00 |
| WO | 2016168700 | 10/2016 | |

OTHER PUBLICATIONS

International Search Report & Written Opinion for related PCT Application PCT/US2017/058282, dated Jan. 18, 2018 (12 pgs).
(Continued)

*Primary Examiner* — Terressa Boykin
(74) *Attorney, Agent, or Firm* — Brooks, Cameron & Huebsch, PLLC

(57) ABSTRACT

Provided are various bimodal polyethylene, including but not limited to a bimodal polyethylene for a pipe having a density of from 0.9340 to 0.9470 gram/cubic centimeters (g/ccm), a melt index (12) of from 0.1 to 0.7 gram/10 minute, a melt flow ratio (121/12) of from 20 to 90. The bimodal polyethylene includes a high molecular weight polyethylene component and a low molecular weight polyethylene component which are a reaction product of a polymerization process performed in a single reactor and that employs a bimodal polymerization catalyst system. The
(Continued)

bimodal polymerization catalyst system includes a bimodal catalyst system of bis(2-pentamethylphenylamido)ethyl)amine Zirconium dibenzyl and either (tetramethylcyclopentadienyl)(n-propylcyclopentadienyl)Zirconium dichloride or (tetramethylcyclopentadienyl)(n-propylcyclopentadienyl) zirconium dimethyl in a 3.0:1 molar ratio; and a trim catalyst of (tetramethylcyclopentadienyl)(n-propylcyclopentadienyl)Zirconium dichloridedimethyl in heptane added to adjust melt.

13 Claims, 1 Drawing Sheet

(52) U.S. Cl.
 CPC ..... *C08L 2205/025* (2013.01); *C08L 2308/00* (2013.01); *C08L 2314/06* (2013.01)
(58) Field of Classification Search
 CPC ................ C08F 210/14; C08F 4/65904; C08L 23/0815; C08L 2205/025; C08L 2201/08; C08L 2314/06; C08L 2308/00
 USPC ...................... 525/191, 192, 240; 528/502 A
 See application file for complete search history.

(56) References Cited

U.S. PATENT DOCUMENTS

| | | |
|---|---|---|
| 8,318,872 B2 | 11/2012 | Savatsky et al. |
| 8,476,370 B2 | 7/2013 | Backman et al. |
| 8,627,840 B2 | 1/2014 | Belloir et al. |
| 9,017,784 B2 | 4/2015 | Palmloef et al. |
| 9,249,286 B2 | 2/2016 | Joseph |
| 9,284,389 B2 | 3/2016 | St. Jean et al. |
| 9,587,055 B2 | 3/2017 | Chai et al. |
| 9,671,047 B2 | 6/2017 | Vogt et al. |
| 2006/0036039 A1 | 2/2006 | Alarcon et al. |
| 2006/0036041 A1 | 2/2006 | Kwalk |
| 2014/0242314 A1 | 8/2014 | Inn et al. |
| 2015/0017365 A1 | 1/2015 | Sohn et al. |
| 2015/0274947 A1 | 10/2015 | Vittorias et al. |
| 2016/0002448 A1 | 1/2016 | Bellehumeur et al. |

OTHER PUBLICATIONS

International Preliminary Report on Patentability for related PCT Application PCT/US2017/058282, dated May 23, 2019 (7 pgs).

\* cited by examiner
† cited by third party

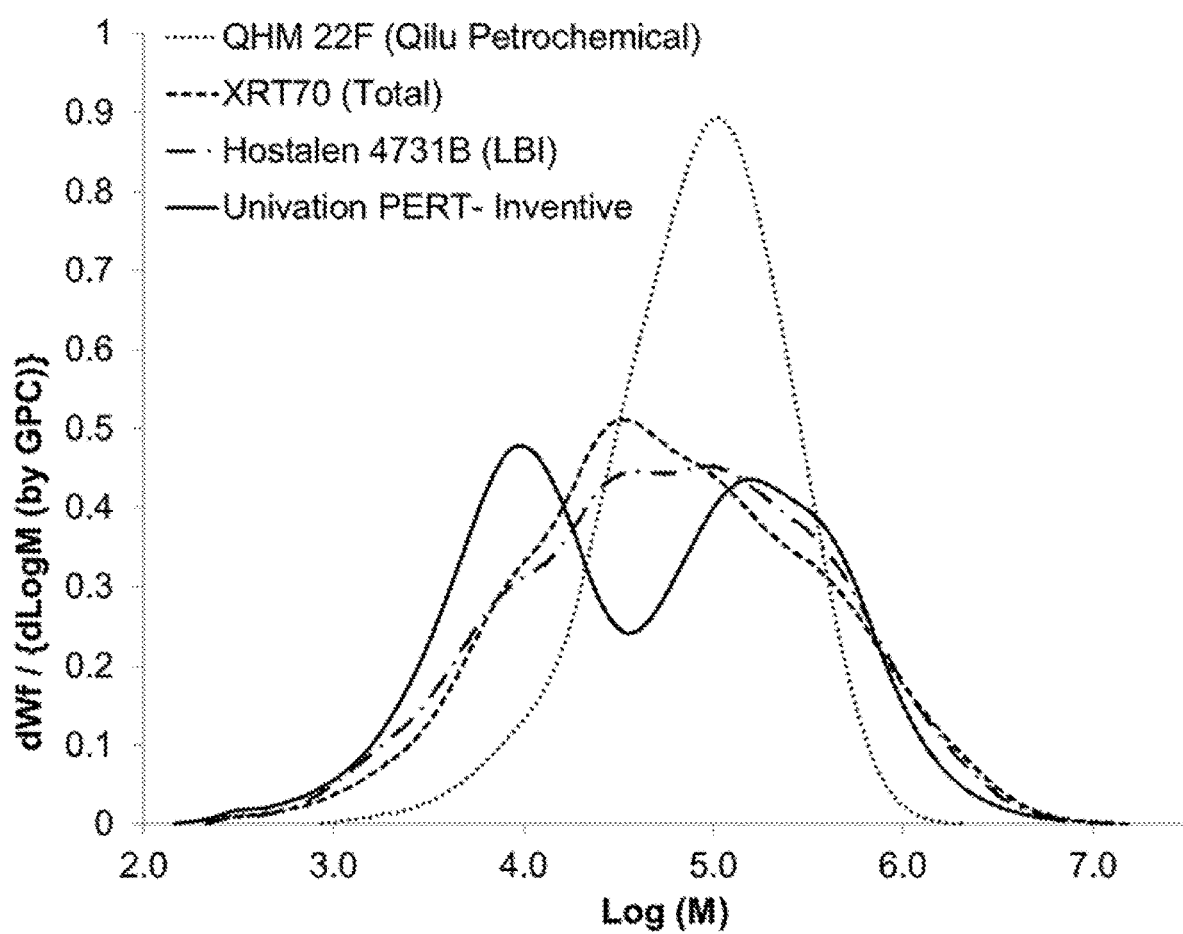

BIMODAL POLYETHYLENE

This application is a National Stage Application under 35 U.S.C. § 371 of International Application Number PCT/US2017/058282, filed Oct. 25, 2017 and published as WO 2018/089195 on May 17, 2018, which claims the benefit to U.S. Provisional Application 62/418,913, filed Nov. 8, 2016, the entire contents of which are incorporated herein by reference in its entirety.

FIELD OF DISCLOSURE

Embodiments of the present disclosure are directed towards a polymer, more specifically, embodiments are directed towards a bimodal polyethylene.

BACKGROUND

Polymers may be utilized for a number of products including films and pipes, among other. Polymers can be formed by reacting one or more types of monomer in a polymerization reaction. There is continued focus in the industry on developing new and improved materials and/or processes that may be utilized to form polymers for existing and new products.

One area of developing new and improved polymer materials and/or processes is for pipes used in hot fluid applications. Polymeric pipes for hot fluid applications must withstand the strain associated with hot fluid, usually hot water, moving under pressure. According to the standard DIN 16833 a hot water pipe must meet the requirement of at least 165 hours before failure at 95° C. and 3.6 M Pa pressure.

An example of a polymer suitable for such hot water applications includes polyethylene of raised temperature resistance (PE-RT). This is a polyethylene polymer used in hot and cold water as well as industrial pipe applications. These materials have a unique molecular structure and crystalline microstructure, which provide excellent long term hydrostatic strength at high temperatures without the need for cross-linking material. Applications for PE-RT include industrial applications, where its temperature resistance may limit traditional polyethylene and metallic materials often suffer from corrosion. So, while advances have been made in PE-RT, there continues to be a need to improve both the hydrostatic strength at high temperatures of PE-RT and the production techniques of such PE-RT materials.

SUMMARY

The present disclosure provides an advance in PE-RT both in terms of improves in both the hydrostatic strength at high temperatures of PE-RT and the production techniques of the PE-RT of the present disclosure, as provided herein. Specifically, the present disclosure provides for a bimodal polyethylene having a density of from 0.930 to 0.950 gram/cubic centimeters (g/ccm); a melt index ($I_2$) of from 0.1 to 1.0 gram/10 minute; a melt flow ratio ($I_{21}/I_2$) of from 20 to 90; wherein the bimodal polyethylene includes a high weight average molecular weight (HMW) polyethylene component and a low weight average molecular weight (LMW) polyethylene component characterized in which a chromatogram of a gel permeation chromatography (GPC) of the bimodal polyethylene displays a resolved bimodal weight average molecular weight distribution with a local minimum in a range of log (molecular weight) 3.5 to 5.5 between a peak representing the HMW polyethylene component and a peak representing the LMW polyethylene component.

BRIEF DESCRIPTION OF DRAWINGS

The FIGURE is a graph showing a molecular weight distribution (MWD) curve taken of a bimodal polyethylene according to an embodiment of the disclosure, using the SEC technique described herein (GPC method). As used in The FIGURE, dWf is the change in weight fraction and dLogM (also referred to as dLog(MW)) is the change in logarithm of molecular weight.

DETAILED DESCRIPTION

For purposes of convenience, various specific test procedures are identified for determining properties, such as average molecular weight, extrapolated stress, polydispersity index (PDI), flow index (FI) and melt flow ratio (MFR). However, when a person of ordinary skill reads this patent and wishes to determine whether a polymer has a particular property identified in a claim, then any published or well-recognized method or test procedure can be followed to determine that property (although the specifically identified procedure is preferred, and that any procedure specified in a claim is mandatory, not merely preferred).

The term "polyethylene" means a polymer made of at least 50% ethylene-derived units, preferably at least 70% ethylene-derived units, more preferably at least 80% ethylene-derived units, or 90% ethylene-derived units, or 95% ethylene-derived units, or even 100% ethylene-derived units. The polyethylene can thus be a homopolymer or a copolymer, including a terpolymer, having other monomeric units. A polyethylene described herein may, for example, include units derived from a co-monomer that is preferably an α-olefin, e.g., propylene, 1-butene, 1-pentene, 1-hexene or mixtures thereof. Other embodiments may include dienes, ethacrylate, or methacrylate.

The term "bimodal," when used herein to describe the bimodal polyethylene, means "bimodal molecular weight distribution," which term is understood as having the broadest definition persons in the pertinent art have given that term as reflected in one or more printed publications or issued patents. At least one example of a bimodal polyethylene of the present disclosure is shown in The FIGURE, in which the horizontal axis is expressed as the log of the molecular weight (Log MW). For example, the bimodal polyethylene seen in The FIGURE includes at a higher molecular weight distribution peak and a lower molecular weight distribution peak, e.g., two peaks (as displayed in The FIGURE), which represents a "bimodal" polyethylene, as that term is used herein. The weight average and number average molecular weights are determined using a High Temperature Gel Permeation Chromatography, as described herein.

A material with more than two different molecular weight distribution peaks will be considered "bimodal" as that term is used herein although the material may also be referred to as "multimodal", e.g., a trimodal or even tetramodal, etc. As noted below, various different types of processes, and reactor configurations, can be used to produce the bimodal polyethylene of the present disclosure, including melt blending, series reactors (i.e., sequentially-configured reactors) and single reactors using a bimodal catalyst system. Any polyethylene regarded as a "multi-modal" composition in U.S. Pat. No. 6,579,922 is considered to fall within the broad meaning of the term "bimodal polyethylene" herein, although important differences exist between the bimodal polyethylene claimed herein and the bimodal compositions disclosed in that patent.

The term "bimodal catalyst system" includes any composition, mixture or system that includes at least two different catalyst compounds, each having the same or a different metal group but generally different ligands or catalyst structure, including a "dual catalyst." Alternatively, each different catalyst compound of the bimodal catalyst system resides on a single support particle, e.g., in which case a dual catalyst is considered to be a supported catalyst. However, the term bimodal catalyst system also broadly includes a system or mixture in which one of the catalysts resides on one collection of support particles, and another catalyst resides on another collection of support particles. Preferably, in that latter instance, the two supported catalysts are introduced to a single reactor, either simultaneously or sequentially, and polymerization is conducted in the presence of the two collections of supported catalysts. Alternatively, the bimodal catalyst system includes a mixture of unsupported catalysts in slurry form.

The term flow index "FI" as used herein means $I_{21}$, which is measured in accordance with ASTM-1238, Condition E, at 190° C. The term melt flow ratio "MFR ($I_{21}/I_2$)" as used herein means the ratio of $I_{21}$ (also referred to as FI) to $I_2$, and both $I_{21}$ and $I_2$ are measured in accordance with ASTM-1238, Condition E, at 190° C. Density is a physical property of a composition, is determined in accordance with ASTM-D-1505, and is expressed as grams per cubic centimeter (or grams per milliliter). The term "raised temperature resistance" as used herein broadly refers to any one or more of a collection of mechanical properties, e.g., strength-related properties, e.g., properties used to characterize resin used in making pipe, particularly resin that would qualify for hot- and cold water tubing and distribution systems components made in one standard dimension ratio and intended for 100 psig (6.9 bar) water service up to and including a maximum working temperature of 180° F. (82° C.). Preferably, the bimodal polyethylene of the present disclosure is characterized by raised temperature resistance measured on a compression molded plaque formed from the bimodal polyethylene, where the measurement is done in accordance with the requirements of ASTM F 1473 PENT test at a stress of 2.4 MPa and a temperature of 90° C. as per ASTM F2769-14. The bimodal polyethylene of the present disclosure can be further characterized by raised temperature resistance as a PE-RT Type II material that when evaluated in accordance with ISO 9080 or equivalent, with internal pressure tests being carried out in accordance with ISO 1167-1 and ISO 1167-2, the bimodal polyethylene conforms to the 4-parameter model given in ISO 24033 for PE-RT Type II material over a range of temperature and internal pressure as provided in ISO 22391. As such, the bimodal polyethylene of the present disclosure can also be referred to herein as a bimodal polyethylene of raised temperature resistance.

As noted below, certain properties or features of the compositions, polymers, pipes, or catalyst systems are expressed in terms of lower limits (e.g., X or greater) or upper limits (e.g., Y or less). It is understood that any of the lower limits can be combined with any of the upper limits, so as to provide a variety of alternative ranges.

The bimodal polyethylene of the present disclosure includes a high weight average molecular weight (HMW) polyethylene component and a low weight average molecular weight (LMW) polyethylene component. The BMW polyethylene component as used herein means the polyethylene component in the bimodal polyethylene that has a higher weight average molecular weight than the weight average molecular weight of at least one other polyethylene component in the same composition. Preferably, the HMW polyethylene component has an identifiable peak, e.g., as shown in The FIGURE. In certain embodiments, the HMW polyethylene component is a component forming a part of the bimodal polyethylene that has a weight average molecular weight (Mw) of 10,000 to 1,000,000. In different specific embodiments, the weight average molecular weight of the HMW polyethylene component may range from a low of 20,000, or 50,000, or 100,000, or 150,000, or 200,000, or 250,000, or 300,000, to a high of 1,000,000, or 900,000, or 800,000, or 700,000, or 600,000, or any combination of the foregoing upper and lower limits.

The LMW polyethylene component as used herein means the polyethylene component in the bimodal polyethylene that has a lower weight average molecular weight than the weight average molecular weight of at least one other polyethylene component in the same bimodal polyethylene. Preferably, the LMW polyethylene component has an identifiable peak, e.g., as shown in The FIGURE. In certain embodiments, the LMW polyethylene component is a component forming a part of the bimodal polyethylene that has a weight average molecular weight (Mw) of from 1,000 to 100,000. In different specific embodiments, the weight average molecular weight of the LMW polyethylene component may range from a low of 3,000, or 5,000, or 8,000, or 10,000, or 12,000, or 15,000, or 20,000, to a high of 100,000, or 50,000, or 40,000, or 35,000, or 30,000, or any combination of the foregoing upper and lower limits.

The term "weight average molecular weight" is a term used to describe a bimodal polyethylene described herein, or to describe a high molecular weight polyethylene component, and a low molecular weight polyethylene component. In either case, the term "average molecular weight" broadly refers to any weight average molecular weight (Mw) as measured or calculated according to any published method, which incorporates procedures, equipment and conditions in ASTM D 3536-91 (1991) and ASTM D 5296-92 (1992).

The weight average molecular weight of a particular polyethylene component recited in the claims, e.g., the HMW component and the LMW component, can also be determined any published method, including those mentioned in the paragraphs above; however, a preferred method is using any published deconvolution procedure, e.g., any published technique for elucidating each individual component polymer's molecular information in a bimodal polymer. A particularly preferred technique is one that uses a Flory deconvolution, including but not limited to the Flory procedures set forth in U.S. Pat. No. 6,534,604 which is incorporated by reference in its entirety.

The FIGURE provides a chromatogram of a gel permeation chromatography (GPC) of an example of the bimodal polyethylene according to the present disclosure. As seen, The FIGURE displays a resolved bimodal molecular weight distribution with a local minimum in a range of log (molecular weight) 3.5 to 5.5 between the peak representing the HMW polyethylene component and the peak representing the LMW polyethylene component. The chromatogram seen in The FIGURE also illustrates the bimodal polyethylene having a ratio of a height of the peak representing the HMW polyethylene component on the chromatogram of the bimodal polyethylene to the local minimum being from 1.2 to 3.0 (height of peak for HMW polyethylene component/local minimum). With respect to the LMW polyethylene component, a ratio of a height of the peak representing the LMW polyethylene component on the chromatogram seen in The FIGURE of the bimodal polyethylene to the local minimum is from 1.2 to 3.0 (height of peak for LMW polyethylene component/local minimum). A ratio of the height of the peak representing the LMW polyethylene component on the chromatogram of the bimodal polyethylene to the height of the peak representing the HMW polyethylene component on the chromatogram of the bimodal polyethylene is from 0.5 to 2.5 (height of LMW polyethylene component/(height of HMW polyethylene component).

The term "split" is defined herein as the weight percent of a high molecular weight component in a bimodal composition. Thus, it describes the relative amount of the high molecular weight component against the low molecular weight component in a bimodal polyethylene, including any of the bimodal polyethylenes described herein. The weight percent of each component can also be represented by the area of each molecular weight distribution curve that is seen after deconvolution of the overall molecular weight distribution curve.

The term "spread" as used herein means the ratio of the weight average molecular weight of the high molecular weight polyethylene component, sometimes referred to as $Mw_{HMW}$, to the weight average molecular weight of the low molecular weight polyethylene component, sometimes referred to as $Mw_{LMW}$. The "spread" can therefore be also expressed as the ratio of $Mw_{HMW}:Mw_{LMW}$.

As used herein, the term "PDI" means polydispersity index, and means the same thing as "MWD" (molecular weight distribution), which term is understood as having the broadest definition persons in the pertinent art have given that term as reflected in one or more printed publications or issued patents. The PDI (MWD) is the ratio of weight-average molecular weight (Mw) to number-average molecular weight (Mn), i.e., Mw/Mn.

In any of the bimodal polyethylene described above or elsewhere herein, the density has a lower limit of 0.930 gram/cubic centimeter (g/ccm), or 0.935 g/ccm, with an upper limit of 0.950 g/ccm, or 0.945 g/ccm, or 0.940 g/ccm, or any combination of the foregoing upper and lower limits. For example, in one embodiment the density of the bimodal polyethylene is from 0.930 g/ccm to 0.950 g/ccm. In any of the bimodal polyethylenes described above or elsewhere herein, the weight average molecular weight (Mw) of the low molecular weight polyethylene component can be, for example, from 1,000 to 100,000, or any of the ranges spanning between other lower and upper limits disclosed elsewhere herein. In any of the bimodal polyethylenes described above or elsewhere herein, the weight average molecular weight (Mw) of the high molecular weight polyethylene component can be, for example, from 10,000 to 1,000,000, or any of the ranges spanning between other lower and upper limits disclosed elsewhere herein.

In any of the bimodal polyethylenes described above or elsewhere herein, the high molecular weight polyethylene component can include a polyethylene that includes a co-monomer being butene, hexene and mixtures thereof, wherein the co-monomer is present in the amount of 1.0 weight percent (wt. %), or preferably more than 2.0 wt. %, or more preferably, more than 3.0 wt. % of the polyethylene. In any of the bimodal polyethylenes described above or elsewhere herein, the low molecular weight polyethylene component can include a polyethylene that includes a co-monomer being butene, hexene and mixtures thereof, wherein the co-monomer is present in the amount of 3.0 wt. %, or preferably less than 2.0 wt. %, or more preferably, less than 1.0 wt. % of the polyethylene.

In one or more of the bimodal polyethylene disclosed herein, the high weight average molecular weight polyethylene component is present in an amount of with a lower limit of 40 wt. %, 45 wt. % or 50 wt. % based on a total weight of the bimodal polyethylene, and an upper limit of 75 wt. %, 70 wt. % or 65 wt. % based on a total weight of the bimodal polyethylene, or any combination of the foregoing upper and lower limits. These weight percents are also termed the "split" as discussed above. In one embodiment, the high weight average molecular weight polyethylene component is present in an amount of 40 to 75 weight percent based on a total weight of the bimodal polyethylene.

In one or more of the bimodal polyethylene disclosed herein, the low weight average molecular weight polyethylene component is present in an amount of with a lower limit of 25 wt. %, 30 wt. % or 35 wt. % based on a total weight of the bimodal polyethylene, and an upper limit of 60 wt. %, 55 wt. % or 50 wt. % based on a total weight of the bimodal polyethylene. So, in one embodiment, the low weight average molecular weight polyethylene component is present in an amount of 25 to 60 weight percent based on a total weight of the bimodal polyethylene.

In one or more of the bimodal polyethylene disclosed herein, the ratio of $Mw_{HMW}:Mw_{LMW}$ as defined previously, can be have a lower limit of 20:1, 25:1, 30:1 or 35:1, and an upper limit of 100:1, 90:1, 80:1 or 70:1, or any combination of the foregoing upper and lower limits. For example, the bimodal polyethylene can have a ratio of the high weight average molecular weight component ($Mw_{HMW}$) to the low weight average molecular weight component ($Mw_{LMW}$) of the bimodal polyethylene that is from 20:1 to 100:1.

In one or more of the bimodal polyethylene disclosed herein, the FI ($I_{21}$) of the bimodal polyethylene can range from 10 to 20 gram/10 minutes (g/10 min). In alternative embodiments, the FI can be expressed as having any one of a number of ranges, e.g., with a lower limit of 10 g/10 min or above, or 11 g/10 min or above, or 12 g/10 min or above, or 13 g/10 min or above, or 14 g/10 min or above; together with an upper limit of 20 g/10 min or below, or 19 g/10 min or below, or 18 g/10 min or below, or 17 g/10 min or below, or 16 g/10 min or below, or any combination of the foregoing upper and lower limits.

In one or more of the bimodal polyethylene disclosed herein, the FI ($I_2$) of the bimodal polyethylene can range from 0.1 to 10 g/10 min. In alternative embodiments, the FI can be expressed as having any one of a number of ranges, e.g., with a lower limit of 0.1 g/10 min or above, or 0.2 g/10 min or above, or 0.3 g/10 min or above, or 0.4 g/10 min; together with an upper limit of 1.0 g/10 min or below, or 0.9 g/10 min or below, or 0.8 g/10 min or below, or 0.7 g/10 min or below, or 0.6 g/10 min or below, or any combination of the foregoing upper and lower limits. In one embodiment, the FI ($I_2$) of the bimodal polyethylene is from 0.1 to 1.0 g/10 min.

In one or more of the bimodal polyethylene disclosed herein, the MFR ($I_{21}/I_2$) can range from 20 to 90. In alternative embodiments, the MFR can be expressed as having any one of a number of ranges, e.g., with a lower limit of 20, or 25, or 30, or 35, or 40; together with an upper limit of 90, or 85, or 80, or 75, or 70, or 65, or 60, or 55, or any combination of the foregoing upper and lower limits.

In one or more of the bimodal polyethylene disclosed herein, the PDI of the overall bimodal polyethylene can be expressed as having any one of a number of ranges, e.g., with a lower limit of 12, or 15; together with an upper limit of 30 or less, or 25 or less, or 20 or less or any combination of the foregoing upper and lower limits. In certain embodiments, the PDI can be 12 to 30, or 12 to 25, or 15 to 25.

In one or more of the bimodal polyethylene disclosed herein, the high and low molecular weight polyethylene components are a reaction product of a polymerization process performed in a single reactor. Examples of such reactors are disclosed elsewhere herein in greater detail. In one or more of the bimodal polyethylene disclosed herein, the high and low molecular weight polyethylene components are the reaction product of a polymerization process performed in a gas phase polymerization process. Details of useful gas phase polymerizations process are described elsewhere herein.

The bimodal polyethylene of the present disclosure is formed using a bimodal catalyst system. In general, the bimodal polyethylene is formed with a zirconocene catalyst of Formula I and a non-metallocene catalyst. For instance, the polymerization catalyst including the zirconocene of Formula I can be employed in a single reactor to form the bimodal polyethylene of the present disclosure.

Zirconocene catalysts are a type of a metallocene catalyst. Metallocene catalyst compounds can include "half sandwich" and/or "full sandwich" compounds having one or more Cp ligands (e.g., cyclopentadienyl and ligands isolobal to cyclopentadienyl) bound to at least one Group 3 to Group 12 metal atom, and one or more leaving groups bound to the at least one metal atom. As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC), unless reference is made to the Previous IUPAC form noted with Roman numerals (also appearing in the same), or unless otherwise noted.

The Cp ligands are one or more rings or ring systems, at least a portion of which includes π-bonded systems, such as cycloalkadienyl ligands and heterocyclic analogues. The rings or ring systems typically include atoms selected from the group consisting of Groups 13 to 16 atoms, and, in a particular exemplary embodiment, the atoms that make up the Cp ligands are selected from the group consisting of carbon, nitrogen, oxygen, silicon, sulfur, phosphorous, germanium, boron, aluminum, and combinations thereof, where carbon makes up at least 50% of the ring members.

In a more particular exemplary embodiment, the Cp ligands are selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl, or "H$_4$ Ind"), substituted versions thereof (as discussed and described in more detail below), and heterocyclic versions thereof.

The metal atom "M" of the metallocene catalyst compound can be selected from the group consisting of Groups 3 through 12 atoms and lanthanide Group atoms in one exemplary embodiment; and selected from the group consisting of Groups 3 through 10 atoms in a more particular exemplary embodiment, and selected from the group consisting of Sc, Ti, Zr, Hf, V, Nb, Ta, Mn, Re, Fe, Ru, Os, Co, Rh, Ir, and Ni in yet a more particular exemplary embodiment; and selected from the group consisting of Groups 4, 5, and 6 atoms in yet a more particular exemplary embodiment, and Ti, Zr, Hf atoms in yet a more particular exemplary embodiment, and Hf in yet a more particular exemplary embodiment. The oxidation state of the metal atom "M" can range from 0 to +7 in one exemplary embodiment; and in a more particular exemplary embodiment, can be +1, +2, +3, +4, or +5; and in yet a more particular exemplary embodiment can be +2, +3 or +4. The groups bound to the metal atom "M" are such that the compounds described below in the formulas and structures are electrically neutral, unless otherwise indicated. The Cp ligand forms at least one chemical bond with the metal atom M to form the "metallocene catalyst compound." The Cp ligands are distinct from the leaving groups bound to the catalyst compound in that they are not highly susceptible to substitution/abstraction reactions.

As used herein, the phrase "catalyst system" or "bimodal catalyst system" includes at least one "catalyst component" and at least one "activator", both of which are described further herein. The catalyst system may also include other components, such as supports, etc., and is not limited to the catalyst component and/or activator alone or in combination. The catalyst system may include any number of catalyst components in any combination as described herein, as well as any activator in any combination as described herein.

As used herein, the phrase "catalyst compound" includes any compound that, once appropriately activated, is capable of catalyzing the polymerization or oligomerization of olefins.

As used herein, the phrase "leaving group" refers to one or more chemical moieties bound to the metal center of the catalyst component that can be abstracted from the catalyst component by an activator, thus producing the species active towards olefin polymerization or oligomerization. As used herein, a "hydrocarbyl" includes aliphatic, cyclic, olefinic, acetylenic and aromatic radicals (i.e., hydrocarbon radicals) comprising hydrogen and carbon that are deficient by one hydrogen. A "hydrocarbylene" is deficient by two hydrogens. As used herein, an "alkyl" includes linear, branched and cyclic paraffin radicals that are deficient by one hydrogen. Thus, for example, a —CH$_3$ group ("methyl") and a CH$_3$CH$_2$— group ("ethyl") are examples of alkyls. As used herein, an "alkenyl" includes linear, branched and cyclic olefin radicals that are deficient by one hydrogen; alkynyl radicals include linear, branched and cyclic acetylene radicals deficient by one hydrogen radical. As used herein, "aryl" groups include phenyl, naphthyl, pyridyl and other radicals whose molecules have the ring structure characteristic of benzene, naphthylene, phenanthrene, anthracene, etc. It is understood that an "aryl" group can be a C6 to C20 aryl group. For example, a C$_6$H$_5$— aromatic structure is an "phenyl", a C$_6$H$_4$— aromatic structure is an "phenylene". An "arylalkyl" group is an alkyl group having an aryl group pendant therefrom. It is understood that an "aralkyl" group can be a C7 to C20 aralkyl group. An "alkylaryl" is an aryl group having one or more alkyl groups pendant therefrom. As used herein, an "alkylene" includes linear, branched and cyclic hydrocarbon radicals deficient by two hydrogens. Thus, —CH$_2$— ("methylene") and —CH$_2$CH$_2$— ("ethylene") are examples of alkylene groups. Other groups deficient by two hydrogen radicals include "arylene" and "alkenylene". As used herein, the phrase "heteroatom" includes any atom other than carbon and hydrogen that can be bound to carbon, and in one embodiment is selected from the group consisting of B, Al, Si, Ge, N, P, O, and S. A "heteroatom-containing group" is a hydrocarbon radical that contains a heteroatom and may contain one or more of the same or different heteroatoms, and from 1 to 3 heteroatoms in a particular embodiment. Non-limiting examples of heteroatom-containing groups include radicals of imines, amines, oxides, phosphines, ethers, ketones, oxoazolines heterocyclics, oxazolines, thioethers, and the like. As used herein, an "alkylcarboxylate", "arylcarboxylate", and "alkylarylcarboxylate" is an alkyl, aryl, and alkylaryl, respectively, that possesses a carboxyl group in any position. Examples include $C_6H_5CH_2C(O)O^-$, $CH_3C(O)O^-$, etc. As used herein, an aralkyl group is defined to be a substituted aryl group. As used herein, the term "substituted" means that the group following that term possesses at least one moiety in place of one or more hydrogens in any position, the moieties selected from such groups as halogen radicals (esp., Cl, F, Br), hydroxyl groups, carbonyl groups, carboxyl groups, amine groups, phosphine groups, alkoxy groups, phenyl groups, naphthyl groups, $C_1$ to $C_{20}$ alkyl groups, $C_2$ to $C_{10}$ alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbornyl radicals, alkyl- and dialkyl-carbamoyl radicals, acyloxy radicals, acylamino radicals, arylamino radicals, and combinations thereof.

Embodiments of the present disclosure include a polymerization catalyst of the Formula I:

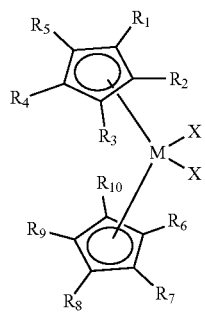

(Formula I)

wherein each of $R^1$ to $R^{10}$ is independently a $C_1$ to $C_{20}$ alkyl, aryl or aralkyl group, or a hydrogen, wherein M is a Group 4 metal, and wherein, each X is independently a halide, $C_1$ to $C_{20}$ alkyl, aralkyl or hydrogen.

Embodiments of the present disclosure can also include a polymerization catalyst of the Formula II:

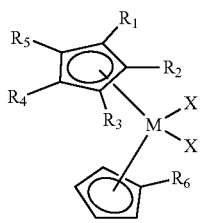

(Formula II)

wherein each of $R^1$ to $R^6$ is independently a $C_1$ to $C_{20}$ alkyl, aryl or aralkyl group, or a hydrogen, wherein M is a Group 4 metal, and wherein, each X is independently a halide, $C_1$ to $C_{20}$ alkyl, aralkyl or hydrogen.

Embodiments of the present disclosure further include a polymerization catalyst of the Formula III:

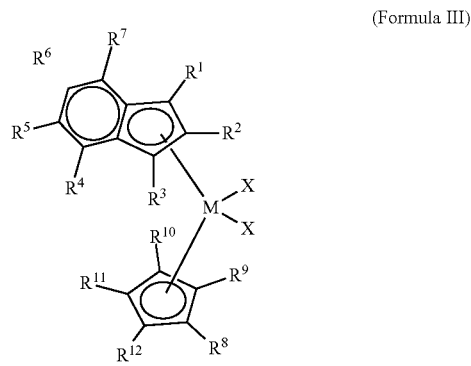

(Formula III)

wherein each of $R^1$ to $R^{12}$ is independently a $C_1$ to $C_{20}$ alkyl, aryl or aralkyl group, or a hydrogen, wherein at least one of $R^4$ to $R^7$ is not a hydrogen, wherein M is a Group 4 metal, and wherein, each X is independently a halide, $C_1$ to $C_{20}$ alkyl, aralkyl or hydrogen. In various embodiments, each of $R_9$, $R_{10}$, and $R_{11}$, and $R_{12}$ of Formula I can be a hydrogen. Further, in Formula III (and in Formulas IV, VI, VI, VII, VIII, IX) it is understood that the 'bottom' Cp ligand (i.e., "CP1" as referenced in Table 1) includes $R^8$-$R^{12}$ while the "top" Cp Ligand (i.e., "CP2") includes $R^1$-$R^3$ as shown in Formulas IV-IX.

In various embodiments, each of $R^9$, $R^{10}$, $R^{11}$ and $R^{12}$ of Formula I can be a hydrogen. For instance, in some embodiments, the polymerization catalyst of Formula I can further comprise a zirconocene catalyst of:

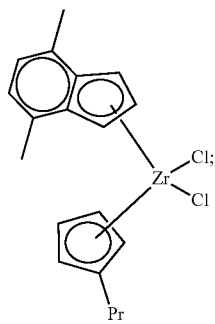

(Formula IV)

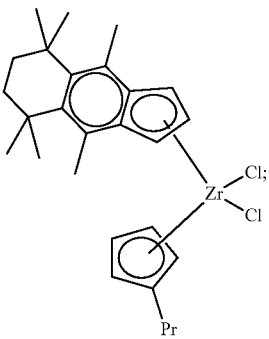

(Formula V)

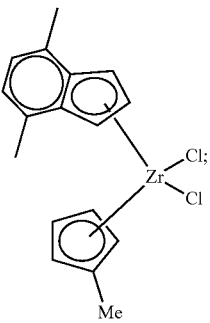
(Formula VI)

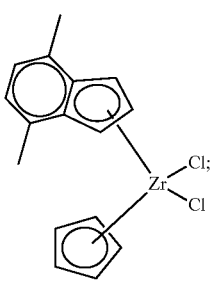
(Formula VII)

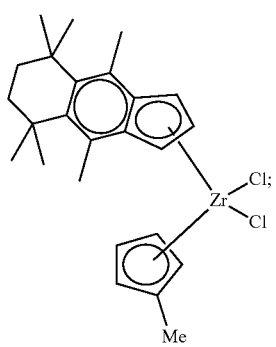
(Formula VIII)

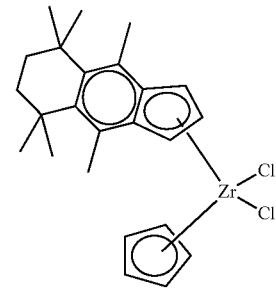
(Formula IX)

That is, in various embodiments, the polymerization catalyst of Formula I can comprise a polymerization catalyst of the Formula IV, V, VI, VII, VIII, IX, or a combination thereof. However, the disclosure is not so limited. Rather, various components of Formula IV, V, VI, VII, VIII, IX, can be added, removed, and/or altered. For example, while Formula IV, V, VI, VII, VIII, IX each illustrate M as being a zirconium atom is understood that X can be varied, for instance, to be a different compound selected from the group consisting of Groups 3 through 12 atoms and lanthanide Group atoms, among other possibilities. As illustrated in Formulas IV, V, VI, VII, VIII, and IX, in various embodiments each of $R^1$, $R^2$, and $R^3$ can be a hydrogen.

In some embodiments adjacent R-groups may combine to form a ring. For example, $R^5$ and $R^6$ of Formula I can together form a cycloalkyl group such as a cyclohexyl-1,1,4,4-tetramethyl, among other possible combinations of adjacent $R^1$ to $R^{12}$ of Formula I and/or other possible types of rings.

In some embodiments, each of $R^7$ and $R^4$ can independently be a $C_1$ to $C_{20}$ alkyl. For instance, $R^8$ is a $C_1$ to $C_{20}$ alkyl and/or a $C_1$ to $C_3$ alkyl, among other possibilities.

In some embodiments, each of $R^1$, $R^2$, $R^3$, of Formula III is a hydrogen. Similarly, in some embodiment, each of $R^5$ and $R^6$ of Formula III is a hydrogen. As mentioned, "M" of the metallocene catalyst of Formula I can, in some embodiments be titanium, zirconium or hafnium.

As mentioned, the polymerization catalyst of Formula I can be included in a bimodal polymerization catalyst system further including a non-metallocene catalyst. The non-metallocene olefin polymerization catalyst may be a Group 15 metal-containing catalyst compound. That is, the bimodal polymerization catalyst system can include one or more Group 15 metal-containing catalyst compounds. As used herein, these are termed non-metallocene olefin polymerization catalyst compounds. The Group 15 metal-containing compound generally includes a Group 3 to 14 metal atom, a Group 3 to 7, or a Group 4 to 6 metal atom. In many embodiments, the Group 15 metal-containing compound includes a Group 4 metal atom bound to at least one leaving group and also bound to at least two Group 15 atoms, at least one of which is also bound to a Group 15 or 16 atom through another group.

In one or more embodiments, at least one of the Group 15 atoms is also bound to a Group 15 or 16 atom through another group which may be a C1 to C20 hydrocarbon group, a heteroatom containing group, silicon, germanium, tin, lead, or phosphorus, where the Group 15 or 16 atom may also be bound to nothing or a hydrogen, a Group 14 atom containing group, a halogen, or a heteroatom containing group, and where each of the two Group 15 atoms are also bound to a cyclic group and can optionally be bound to hydrogen, a halogen, a heteroatom or a hydrocarbyl group, or a heteroatom containing group.

The Group 15-containing metal compounds can be described more particularly with structures (X) or (XI):

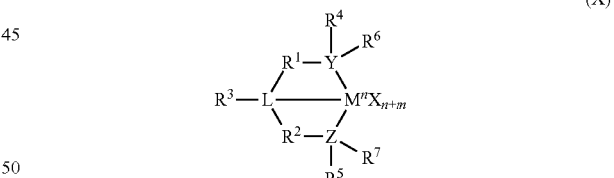
(X)

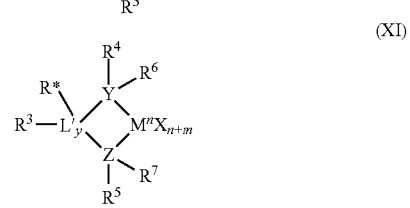
(XI)

where M is a Group 3 to 12 transition metal or a Group 13 or 14 main group metal, a Group 4, 5, or 6 metal. In many embodiments, M is a Group 4 metal, such as zirconium, titanium, or hafnium. Each X is independently a leaving group, such as an anionic leaving group. The leaving group may include a hydrogen, a hydrocarbyl group, a heteroatom, a halogen, or an alkyl; y is 0 or 1 (when y is 0 group L' is absent). The term 'n' is the oxidation state of M. In various embodiments, n is +3, +4, or +5. In many embodiments, n is +4. The term 'm' represents the formal charge of the YZL or the YZL' ligand, and is 0, −1, −2 or −3 in various embodiments. In many embodiments, m is −2. L is a Group 15 or 16 element, such as nitrogen or oxygen; L' is a Group 15 or 16 element or Group 14 containing group, such as carbon, silicon or germanium. Y is a Group 15 element, such as nitrogen or phosphorus. In many embodiments, Y is nitrogen. Z is a Group 15 element, such as nitrogen or phosphorus. In many embodiments, Z is nitrogen. $R^1$ and $R^2$ are, independently, a $C_1$ to $C_{20}$ hydrocarbon group, a heteroatom containing group having up to twenty carbon atoms, silicon, germanium, tin, lead, or phosphorus. In many embodiments, $R^1$ and $R^2$ are a $C_2$ to C20 alkyl, aryl or aralkyl group, such as a linear, branched or cyclic $C_2$ to C20 alkyl group, or a $C_2$ to $C_6$ hydrocarbon group. $R^1$ and $R^2$ may also be interconnected to each other. $R^3$ may be absent or may be a hydrocarbon group, a hydrogen, a halogen, a heteroatom containing group. In many embodiments, $R^3$ is absent, for example, if L is an oxygen, or a hydrogen, or a linear, cyclic, or branched alkyl group having 1 to 20 carbon atoms. $R^4$ and $R^5$ are independently an alkyl group, an aryl group, substituted aryl group, a cyclic alkyl group, a substituted cyclic alkyl group, a cyclic aralkyl group, a substituted cyclic aralkyl group, or multiple ring system, often having up to 20 carbon atoms. In many embodiments, $R^4$ and $R^5$ have between 3 and 10 carbon atoms, or are a $C_1$ to $C_{20}$ hydrocarbon group, a $C_1$ to $C_{20}$ aryl group or a $C_1$ to $C_{20}$ aralkyl group, or a heteroatom containing group. $R^4$ and $R^5$ may be interconnected to each other. $R^6$ and $R^7$ are independently absent, hydrogen, an alkyl group, halogen, heteroatom, or a hydrocarbyl group, such as a linear, cyclic or branched alkyl group having 1 to 20 carbon atoms. In many embodiments, $R^6$ and $R^7$ are absent. R* may be absent, or may be a hydrogen, a Group 14 atom containing group, a halogen, or a heteroatom containing group.

By "formal charge of the YZL or YZL' ligand," it is meant the charge of the entire ligand absent the metal and the leaving groups X. By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups.

In one or more embodiments, $R^4$ and $R^5$ are independently a group represented by the following structure (XII).

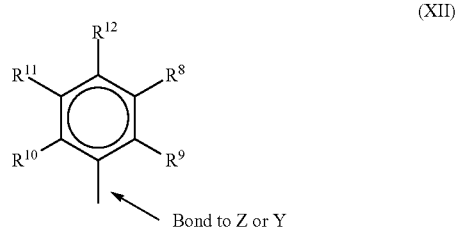

Bond to Z or Y when $R^4$ and $R^5$ are independently an alkyl group, an aryl group, substituted aryl group, a cyclic alkyl group, a substituted cyclic alkyl group, a cyclic aralkyl group, a substituted cyclic aralkyl group, or multiple ring system, often having up to 20 carbon atoms. In many embodiments, $R^4$ and $R^5$ have between 3 and 10 carbon atoms, or are a $C_1$ to $C_{20}$ hydrocarbon group, a $C_1$ to $C_{20}$ aryl group or a C, to $C_{20}$ aralkyl group, or a heteroatom containing group. $R^4$ and $R^5$ may be interconnected to each other, $R^8$ to $R^{12}$ are each independently hydrogen, a $C_1$ to $C_{40}$ alkyl group, a halide, a heteroatom, a heteroatom containing group containing up to 40 carbon atoms. In many embodiments, $R^8$ to $R^{12}$ are a $C_1$ to $C_{20}$ linear or branched alkyl group, such as a methyl, ethyl, propyl, or butyl group. Any two of the R groups may form a cyclic group and/or a heterocyclic group. The cyclic groups may be aromatic. In one embodiment $R^9$, $R^{10}$ and $R^{12}$ are independently a methyl, ethyl, propyl, or butyl group (including all isomers). In another embodiment, $R^9$, $R^{10}$ and $R^{12}$ are methyl groups, and $R^8$ and $R^{11}$ are hydrogen.

In one or more embodiments, $R^4$ and $R^5$ are both a group represented by the following structure (XIII).

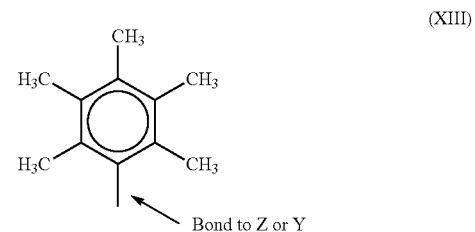

Bond to Z or Y

When $R^4$ and $R^5$ follow structure (XIII), M is a Group 4 metal, such as zirconium, titanium, or hafnium. In many embodiments, M is zirconium. Each of L, Y, and Z may be a nitrogen. Each of $R^1$ and $R^2$ may be —$CH_2$—$CH_2$—. $R^3$ may be hydrogen, and $R^6$ and $R^7$ may be absent.

The bimodal polymerization catalyst system may include a catalyst component in a slurry, which may have an initial catalyst compound, and an added solution catalyst component that is added to the slurry. Generally, a non-metallocene olefin polymerization catalyst will be supported in the initial slurry, depending on solubility. However, in some embodiments, the initial catalyst component slurry may have no catalysts but may have an activator or support. In this case, two or more solution catalysts may be added to the slurry to cause each to be supported.

Any number of combinations of catalyst components may be used in embodiments. For example, the catalyst component slurry can include an activator and a support, or a supported activator. Further, the slurry can include a catalyst compound in addition to the activator and the support. As noted, the catalyst compound in the slurry may be supported.

The slurry may include one or more activators and supports, and one more catalyst compounds. For example, the slurry may include two or more activators (such as alumoxane and a modified alumoxane) and a catalyst compound, or the slurry may include a supported activator and more than one catalyst compounds. In one embodiment, the slurry includes a support, an activator, and two catalyst compounds. In another embodiment the slurry includes a support, an activator and two different catalyst compounds, which may be added to the slurry separately or in combination. The slurry, containing silica and alumoxane, may be contacted with a catalyst compound, allowed to react, and thereafter the slurry is contacted with another catalyst compound, for example, in a trim system.

The molar ratio of metal in the activator to metal in the catalyst compound in the slurry may be 1000:1 to 0.5:1, 300:1 to 1:1, or 150:1 to 1:1. The slurry can include a support material which may be any inert particulate carrier material known in the art, including, but not limited to, silica, fumed silica, alumina, clay, talc or other support materials such as disclosed above. In one embodiment, the slurry contains silica and an activator, such as methyl aluminoxane ("MAO"), modified methyl aluminoxane ("MMAO"), as discussed further below.

One or more diluents or carriers can be used to facilitate the combination of any two or more components of the catalyst system in the slurry or in the trim catalyst solution. For example, the single site catalyst compound and the activator can be combined together in the presence of toluene or another non-reactive hydrocarbon or hydrocarbon mixture to provide the catalyst mixture.

In addition to toluene, other suitable diluents can include, but are not limited to, ethylbenzene, xylene, pentane, hexane, heptane, octane, other hydrocarbons, or any combination thereof. The support, either dry or mixed with toluene can then be added to the catalyst mixture or the catalyst/activator mixture can be added to the support.

The catalyst is not limited to a slurry arrangement, as a mixed catalyst system may be made on a support and dried. The dried catalyst system can then be fed to the reactor through a dry feed system.

As used herein, the terms "support" and "carrier" are used interchangeably and refer to any support material, including a porous support material, such as talc, inorganic oxides, and inorganic chlorides. The one or more single site catalyst compounds of the slurry can be supported on the same or separate supports together with the activator, or the activator can be used in an unsupported form, or can be deposited on a support different from the single site catalyst compounds, or any combination thereof. This may be accomplished by any technique commonly used in the art. There are various other methods in the art for supporting a single site catalyst compound. The single site catalyst compounds of the slurry can be spray dried. The support used with the single site catalyst compound can be functionalized, or at least one substituent or leaving group is selected. The support material may be any of the conventional support materials.

Preferably the supported material is a porous support material, for example, talc, an inorganic oxide, or an inorganic chloride. Other support materials include resinous support materials (e.g., polystyrene), functionalized or crosslinked organic supports, such as polystyrene divinyl benzene polyolefins or polymeric compounds, zeolites, clays, or any other organic or inorganic support material and the like, or mixtures thereof.

Preferred support materials are inorganic oxides that include those Group 2, 3, 4, 5, 13 or 14 metal oxides. The preferred supports include silica, fumed silica, alumina (WO 99/60033), silica-alumina and mixtures thereof. Other useful supports include magnesia, titania, zirconia, magnesium chloride (U.S. Pat. No. 5,965,477), montmorillonite (European Patent EP-BI 0 5 11 665), phyllosilicate, zeolites, talc, clays (U.S. Pat. No. 6,034,187) and the like. Also, combinations of these support materials may be used, for example, silica-chromium, silica-alumina, silica-titania and the like. Additional support materials may include those porous acrylic polymers described in EP 0 767 184 BI.

Other support materials include nanocomposites as described in PCT WO 99/47598, aerogels as described in WO 99/48605, spherulites as described in U.S. Pat. No. 5,972,510 and polymeric beads as described in WO 99/5031 1. An example of a suitable support is fumed silica available under the trade name Cabosil™ TS-610, or other TS- or TG-series supports, available from Cabot Corporation. Fumed silica is typically a silica with particles 7 to 30 nanometers in size that has been treated with dimethylsilyl-dichloride (i.e., dichlorodimethylsilane) such that a majority of the surface hydroxyl groups are capped.

It is typically preferred that the support material, preferably an inorganic oxide, has a surface area in the range of from 10 to 700 meter/gram (m/g), pore volume in the range of from 0.1 to 4.0 $cm^3/g$ and average particle size in the range of from 5 to 500 μm. More preferably, the surface area of the support material is in the range of from 50 to 500 m/g, pore volume of from 0.5 to 3.5 $cm^3/g$ and average particle size of from 10 to 200 μm. Most preferably the surface area of the support material is in the range is from 100 to 400 m/g, pore volume from 0.8 to 3.0 $cm^3/g$ and average particle size is from 5 to 100 μm.

The support materials may be treated chemically, for example with a fluoride compound as described in WO 00/12565. Other supported activators are described in for example WO 00/13792 that refers to supported boron containing solid acid complex.

In a method of forming a supported catalyst composition component, the amount of liquid in which the activator is present is in an amount that is less than four times the pore volume of the support material, more preferably less than three times, even more preferably less than two times; preferred ranges being from 1.1 times to 3.5 times range and most preferably in the 1.2 to 3 times range. In an alternative embodiment, the amount of liquid in which the activator is present is from one to less than one times the pore volume of the support material utilized in forming the supported activator. Procedures for measuring the total pore volume of a porous support are well known in the art.

As used herein, the term "activator" may refer to any compound or combination of compounds, supported, or unsupported, which can activate a single site catalyst compound or component, such as by creating a cationic species of the catalyst component. For example, this can include the abstraction of at least one leaving group (the "X" group in the single site catalyst compounds described herein) from the metal center of the single site catalyst compound/component. The activator may also be referred to as a "co-catalyst".

For example, the activator can include a Lewis acid or a non-coordinating ionic activator or ionizing activator, or any other compound including Lewis bases, aluminum alkyls, and/or conventional-type co-catalysts. In addition to methylaluminoxane ("MAO") and modified methylaluminoxane ("MMAO") mentioned above, illustrative activators can include, but are not limited to, aluminoxane or modified aluminoxane, and/or ionizing compounds, neutral or ionic, such as tri (n-butyl)ammonium tetrakis(pentafluorophenyl) boron, a trisperfluorophenyl boron metalloid precursor, a trisperfluoronaphthyl boron metalloid precursor, or any combinations thereof.

Aluminoxanes can be described as oligomeric aluminum compounds having —Al(R)—O-subunits, where R is an alkyl group. Examples of aluminoxanes include, but are not limited to MAO, MMAO, ethylaluminoxane, isobutylaluminoxane, or a combination thereof. Aluminoxanes can be produced by the hydrolysis of the respective trialkylaluminum compound. MMAO can be produced by the hydrolysis of trimethylaluminum and a higher trialkylaluminum, such as triisobutylaluminum. MMAOs are generally more soluble in aliphatic solvents and more stable during storage. There are a variety of methods for preparing aluminoxane and modified aluminoxanes.

As noted above, one or more organo-aluminum compounds such as one or more alkylaluminum compounds can be used in conjunction with the aluminoxanes. For example, alkylaluminum species that may be used are diethylaluminum ethoxide, diethylaluminum chloride, and/or diisobutylaluminum hydride. Examples of trialkylaluminum compounds include, but are not limited to, trimethylaluminum, triethylaluminum ("TEAL"), triisobutylaluminum ("TiBAl"), tri-n-hexylaluminum, tri-n-octylaluminum, tripropylaluminum, tributylaluminum, and the like.

The bimodal catalyst system may include only a catalyst compound, such as a zirconocene, or may include an activator in addition to the catalyst compound. The bimodal catalyst system used in the trim process can be prepared by dissolving the catalyst compound and optional activators in a liquid solvent. The liquid solvent may be an alkane, such as a C5 to C30 alkane, or a C5 to C10 alkane. Cyclic alkanes such as cyclohexane and aromatic compounds such as toluene may also be used. In addition, mineral oil may be used as a solvent. The solution employed should be liquid under the feed conditions to the polymerization reactor, and relatively inert. In one embodiment, the liquid utilized in the catalyst compound solution is different from the diluent used in the catalyst component slurry. In another embodiment, the liquid utilized in the catalyst compound solution is the same as the diluent used in the bimodal catalyst system.

If the bimodal catalyst system includes both activator and catalyst compound, the ratio of metal in the activator to metal in the catalyst compound in the solution may be 1000:1 to 0.5:1, 300:1 to 1:1, or 150:1 to 1:1. In various embodiments, the activator and catalyst compound are present in the solution at up to 90 wt. %, at up to 50 wt. %, at up to 20 wt. %, up to 10 wt. %, at up to 5 wt. %, at less than 1 wt. %, or between 100 ppm and 1 wt. %, based upon the weight of the solvent and the activator or catalyst compound.

The catalyst component solution can comprise any one of the soluble catalyst compounds described in the catalyst section herein. As the catalyst is dissolved in the solution, a higher solubility is desirable. Accordingly, the catalyst compound in the catalyst component solution may often include a metallocene, which may have higher solubility than other catalysts.

In the polymerization process, described below, any of the above described catalyst component containing solutions may be combined with any of the catalyst component containing slurry/slurries described above. In addition, more than one catalyst component solution may be utilized.

In gas-phase polyethylene production processes, it may be desirable to use one or more static control agents to aid in regulating static levels in the reactor. As used herein, a static control agent is a chemical composition which, when introduced into a fluidized bed reactor, may influence or drive the static charge (negatively, positively, or to zero) in the fluidized bed. The specific static control agent used may depend upon the nature of the static charge, and the choice of static control agent may vary dependent upon the polymer being produced and the single site catalyst compounds being used.

Control agents such as aluminum stearate may be employed. The static control agent used may be selected for its ability to receive the static charge in the fluidized bed without adversely affecting productivity. Other suitable static control agents may also include aluminum distearate, ethoxlated amines, and anti-static compositions such as those provided by Innospec Inc. under the trade name OCTASTAT. For example, OCTASTAT 2000 is a mixture of a polysulfone copolymer, a polymeric polyamine, and oil-soluble sulfonic acid.

The aforementioned control agents and other control agents may be employed either alone or in combination as a control agent. For example, the carboxylate metal salt may be combined with an amine containing control agent (e.g., a carboxylate metal salt with any family member belonging to the KEMAMINE® (available from Crompton Corporation) or ATMER® (available from ICI Americas Inc.) family of products).

Other useful continuity additives include ethyleneimine additives useful in embodiments disclosed herein may include polyethyleneimines having the following general formula: —$(CH_2-CH_2-NH)_n$—, in which n may be from 10 to 10,000. The polyethyleneimines may be linear, branched, or hyperbranched (e.g., forming dendritic or arborescent polymer structures).

They can be a homopolymer or copolymer of ethyleneimine or mixtures thereof (referred to as polyethyleneimine(s) hereafter). Although linear polymers represented by the chemical formula —[CH2-CH2-NH]— may be used as the polyethyleneimine, materials having primary, secondary, and tertiary branches can also be used. Commercial polyethyleneimine can be a compound having branches of the ethyleneimine polymer.

Suitable polyethyleneimines are commercially available from BASF Corporation under the trade name Lupasol. These compounds can be prepared as a wide range of molecular weights and product activities. Examples of commercial polyethyleneimines sold by BASF suitable for use in the present invention include, but are not limited to, Lupasol FG and Lupasol WF.

Another useful continuity additive can include a mixture of aluminum distearate and an ethoxylated amine-type compound, e.g., IRGASTAT AS-990, available from Huntsman (formerly Ciba Specialty Chemicals). The mixture of aluminum distearate and ethoxylated amine type compound can be slurried in mineral oil e.g., Hydrobrite 380. For example, the mixture of aluminum distearate and an ethoxylated amine type compound can be slurried in mineral oil to have total slurry concentration of ranging from 5 wt. % to 50 wt. % or 10 wt. % to 40 wt. %, or 15 wt. % to 30 wt. %. Other static control agents and additives are applicable.

The continuity additive(s) or static control agent(s) may be added to the reactor in an amount ranging from 0.05 to 200 ppm, based on the weight of all feeds to the reactor, excluding recycle. In some embodiments, the continuity additive may be added in an amount ranging from 2 to 100 ppm, or in an amount ranging from 4 to 50 ppm.

One or more of the bimodal polyethylene disclosed herein can be made from polymerization conducted in the presence of a bimodal catalyst system that includes bis(2-(2,4,6-trimethylphenylamido)ethyl)amine zirconium dibenzyl. In one or more of the bimodal polyethylene disclosed herein, the high and low molecular weight polyethylene components can be formed from polymerization conducted in the presence of a bimodal catalyst system that includes bis(2-(pentamethylphenylamido)ethyl)amine zirconium dibenzyl. In one or more of the bimodal polyethylenes disclosed herein, the high and low molecular weight polyethylene components can be formed from polymerization conducted in the presence of a bimodal catalyst system that includes (pentamethylcyclopentadienyl)(n-propylcyclopentadienyl) zirconium dichloride or (pentamethylcyclopentadienyl)(n-propylcyclopentadienyl)zirconium dimethyl. In one or more of the bimodal polyethylene disclosed herein, the high and low molecular weight polyethylene components can be formed from polymerization conducted in the presence of a bimodal catalyst system that includes bis(n-butylcyclopentadienyl)zirconium dichloride or bis(n-butylcyclopentadienyl)zirconium dimethyl.

One or more of the bimodal polyethylene disclosed herein can also be made from polymerization conducted in the presence of a bimodal catalyst system that includes both bis(2-(pentamethylphenylamido)ethyl)amine zirconium dibenzyl and either (tetramethylcyclopentadienyl)(n-propylcyclopentadienyl)zirconium dichloride or (tetramethylcyclopentadienyl)(n-propylcyclopentadienyl)zirconium dimethyl in a 3.0:1 molar ratio and a trim catalyst of (tetramethylcyclopentadienyl)(n-propylcyclopentadienyl) zirconium dimethyl. The trim catalyst of (tetramethylcyclopentadienyl)(n-propylcyclopentadienyl)zirconium dimethyl can be present in an alkane solvent, which is added to adjust the melt flow ratio of the bimodal polyethylene. The bimodal polyethylene formed using this combination of catalysts can be formed using a single reactor, as provided herein. The alkane solvent has from 3 to 7 carbon atoms and can be branched or linear. Examples of the alkane solvent include hexane, isopentane and isobutane.

The polymerization process used to form any of the bimodal polyethylene described herein, may be carried out using any suitable process, for example, high pressure, solution, slurry and gas phase process using known equipment and reaction conditions, and are not limited to any specific type of polymerization system. Generally, the polymerization temperatures may range from 0 to 300° C. at atmospheric, sub-atmospheric, or super-atmospheric pressures. In particular, slurry or solution polymerization systems may employ subatmospheric, or alternatively, superatmospheric pressures, and temperatures in the range of 40 to 300° C.

The present disclosure is not limited to any specific type of fluidized or gas phase polymerization reaction and can be carried out in a single reactor or multiple reactors such as two or more reactors in series. In embodiments, the present invention may be carried out in fluidized bed polymerizations (that may be mechanically stirred and/or gas fluidized), or with those utilizing a gas phase, similar to that as described herein. In addition to well-known conventional gas phase polymerization processes, it is within the scope of the present disclosure that "condensing mode," including the "induced condensing mode" and "liquid monomer" operation of a gas phase polymerization may be used.

Embodiments may employ a condensing mode polymerization, such as those disclosed in U.S. Pat. Nos. 4,543,399; 4,588,790; 4,994,534; 5,352,749; 5,462,999; and 6,489,408. Condensing mode processes may be used to achieve higher cooling capacities and, hence, higher reactor productivity. In addition to condensable fluids of the polymerization process itself, other condensable fluids inert to the polymerization may be introduced to induce a condensing mode operation, such as by the processes described in U.S. Pat. No. 5,436,304.

Liquid phase polymerization systems such as those described in U.S. Pat. No. 3,324,095, may be used in some embodiments. Liquid phase polymerization systems generally comprise a reactor to which olefin monomers and catalyst compositions are added. The reactor contains a liquid reaction medium which may dissolve or suspend the polyolefin product. This liquid reaction medium may comprise an inert liquid hydrocarbon which is non-reactive under the polymerization conditions employed, the bulk liquid monomer, or a mixture thereof. Although such an inert liquid hydrocarbon may not function as a solvent for the catalyst composition or the polymer obtained by the process, it usually serves as solvent for the monomers used in the polymerization. Inert liquid hydrocarbons suitable for this purpose may include isobutane, isopentane, hexane, cyclohexane, isohexane, heptane, octane, benzene, toluene, and mixtures and isomers thereof. Reactive contact between the olefin monomer and the catalyst composition may be maintained by constant stirring or agitation. The liquid reaction medium which contains the olefin polymer product and unreacted olefin monomer is withdrawn from the reactor continuously. The olefin polymer product is separated, and the unreacted olefin monomer and liquid reaction medium are typically recycled and fed back into the reactor.

Some embodiments of this disclosure may be especially useful with gas phase polymerization systems, at superatmospheric pressures in the range from 0.07 to 68.9 bar (1 to 1000 psig), from 3.45 to 27.6 bar (50 to 400 psig) in some embodiments, from 6.89 to 24.1 bar (100 to 350 psig) in other embodiments, and temperatures in the range from 30 to 130° C., or from 65 to 110° C., from 75 to 120° C. in other embodiments, or from 80 to 120° C. in other embodiments. In some embodiments, operating temperatures may be less than 112° C. Stirred or fluidized bed gas phase polymerization systems may be of use in embodiments.

The bimodal polyethylene can be made using a gas phase polymerization process, e.g., utilizing a fluidized bed reactor. This type reactor and means for operating the reactor are well known and completely described in, for example, U.S. Pat. Nos. 3,709,853; 4,003,712; 4,011,382; 4,302,566; 4,543,399; 4,882,400; 5,352,749; 5,541,270; EP-A-0 802 202 and Belgian Patent No. 839,380. These patents disclose gas phase polymerization processes wherein the polymerization medium is either mechanically agitated or fluidized by the continuous flow of the gaseous monomer and diluent.

Other gas phase processes contemplated include series or multistage polymerization processes. Examples include U.S. Pat. Nos. 5,627,242, 5,665,818 and 5,677,375, and European publications EP-A-0 794 200 EP-B 1-0 649 992, EP-A-0 802 202 and EP-B-634421.

A polymerization process may be performed as a continuous gas phase process such as a fluid bed process. A fluid bed reactor may comprise a reaction zone and a so-called velocity reduction zone. The reaction zone may comprise a bed of growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may optionally be removed in a cyclone and/or fine filter. The gas is passed through a heat exchanger wherein the heat of polymerization is removed, compressed in a compressor and then returned to the reaction zone.

The reactor temperature of the fluid bed process herein preferably ranges from 30° C. or 40° C. or 50° C. to 90° C. or 100° C. or 110° C. or 120° C. In general, the reactor temperature is operated at the highest temperature that is feasible taking into account the sintering temperature of the bimodal polyethylene product within the reactor. Regardless of the process used to make the bimodal polyethylene of the disclosure, the polymerization temperature, or reaction temperature should be below the melting or "sintering" temperature of the bimodal polyethylene to be formed. Thus, the upper temperature limit in one embodiment is the melting temperature of the bimodal polyethylene produced in the reactor.

A slurry polymerization process can also be used. A slurry polymerization process generally uses pressures in the range of from 1 to 50 atmospheres and even greater and temperatures in the range of 0° C. to 120° C., and more particularly from 30° C. to 100° C. In a slurry polymerization, a suspension of solid, particulate polymer is a reaction product formed in a liquid polymerization diluent medium to which ethylene and co-monomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, a branched alkane in one embodiment. The medium employed should be liquid under the conditions of polymerization and relatively inert. When a propane medium is used the process must be operated above the reaction diluent critical temperature and pressure. In one embodiment, a hexane, isopentane or isobutane medium is employed.

Also useful is particle form polymerization, a process where the temperature is kept below the temperature at which the bimodal polyethylene goes into solution. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484 and 2 Metallocene-Based Polyolefins 322-332 (2000).

These processes can be used for the production of the bimodal polyethylene. Preferably the olefins are ethylene and, optionally, a co-monomer comprising from 3 to 7 carbon atoms. Particularly preferred are polyethylenes. Such polyethylenes are preferably homopolymers of ethylene and interpolymers of ethylene and at least one α-olefin where the ethylene content is at least about 50 percent by weight of the total monomers involved. Exemplary olefins that may be utilized herein are ethylene, propylene, 1-butene, 1-pentene, 1-hexene, 1-heptene and the like. Also utilizable herein are polyenes such as 1,3-hexadiene, 1,4-hexadiene, cyclopentadiene, and olefins formed in situ in the polymerization medium. When olefins are formed in situ in the polymerization medium, the formation of polyolefins containing long chain branching may occur.

In the production of the bimodal polyethylene, co-monomers may be present in the polymerization reactor. When present, the co-monomer may be present at any level with the ethylene monomer that will achieve the desired weight percent incorporation of the co-monomer into the bimodal polyethylene. In one embodiment of the bimodal polyethylene, the co-monomer is present with ethylene in a mole ratio range of from 0.0001 (co-monomer:ethylene) to 50, and from 0.0001 to 5 in another embodiment, and from 0.0005 to 1.0 in yet another embodiment, and from 0.001 to 0.5 in yet another embodiment. Expressed in absolute terms, in making bimodal polyethylene, the amount of ethylene present in the polymerization reactor may range to up to 1000 atmospheres pressure in one embodiment, and up to 500 atmospheres pressure in another embodiment, and up to 200 atmospheres pressure in yet another embodiment, and up to 100 atmospheres in yet another embodiment, and up to 50 atmospheres in yet another embodiment.

Hydrogen gas is often used in olefin polymerization to control the final properties of the polyolefin, such as described in Polypropylene Handbook 76-78 (Hanser Publishers, 1996). Using certain catalyst systems, increasing concentrations (partial pressures) of hydrogen can increase the melt flow rate (MFR) (also referred to herein as melt index (MI)) of the polyolefin generated. The MFR or MI can thus be influenced by the hydrogen concentration. The amount of hydrogen in the polymerization can be expressed as a mole ratio relative to the total polymerizable monomer, for example, ethylene, or a blend of ethylene and hexene, propene, pentene and mixtures thereof. The amount of hydrogen used in the polymerization process of the present disclosure is an amount necessary to achieve the desired MFR or MI of the final polyolefin resin. In one embodiment, the mole ratio of hydrogen to total monomer ($H_2$ monomer) is in a range of from greater than 0.0001 in one embodiment, and from greater than 0.0005 in another embodiment, and from greater than 0.001 in yet another embodiment, and less than 10 in yet another embodiment, and less than 5 in yet another embodiment, and less than 3 in yet another embodiment, and less than 0.10 in yet another embodiment, wherein a desirable range may comprise any combination of any upper mole ratio limit with any lower mole ratio limit described herein. Expressed another way, the amount of hydrogen in the reactor at any time may range to up to 5000 ppm, and up to 4000 ppm in another embodiment, and up to 3000 ppm in yet another embodiment, and between 50 ppm and 5000 ppm in yet another embodiment, and between 500 ppm and 2000 ppm in another embodiment.

The one or more reactor pressures in a gas phase process (either single reactor or two or more reactors) may vary from 100 psig (690 kPa) to 500 psig (3448 kPa), and in the range of from 200 psig (1379 kPa) to 400 psig (2759 kPa) in another embodiment, and in the range of from 250 psig (1724 kPa) to 350 psig (2414 kPa) in yet another embodiment.

The gas phase reactor employing the catalyst system described herein is capable of producing from 500 lbs of polymer per hour (227 Kg/hr) to 200,000 lbs/hr (90,900 Kg/hr), and greater than 1000 lbs/hr (455 Kg/hr) in another embodiment, and greater than 10,000 lbs/hr (4540 Kg/hr) in yet another embodiment, and greater than 25,000 lbs/hr (11,300 Kg/hr) in yet another embodiment, and greater than 35,000 lbs/hr (15,900 Kg/hr) in yet another embodiment, and greater than 50,000 lbs/hr (22,700 Kg/hr) in yet another embodiment, and from 65,000 lbs/hr (29,000 Kg/hr) to 100,000 lbs/hr (45,500 Kg/hr) in yet another embodiment.

Processes disclosed herein may optionally use inert particulate materials as fluidization aids. These inert particulate materials can include carbon black, silica, talc, and clays, as well as inert polymeric materials. Carbon black, for example, has a primary particle size of 10 to 100 nanometers, an average size of aggregate of 0.1 to 30 microns, and a specific surface area from 30 to 1 500 $m^2/g$. Silica has a primary particle size of 5 to 50 nanometers, an average size of aggregate of 0.1 to 30 microns, and a specific surface area from 5 0 to 500 $m^2/g$. Clay, talc, and polymeric materials have an average particle size of 0.01 to 10 microns and a specific surface area of 3 to 30 $m^2/g$. These inert particulate materials may be used in amounts ranging from 0.3 to 80%, or from 5 to 50%, based on the weight of the final product.

Chain transfer agents, promoters, scavenging agents and other additives may be, and often are, used in the polymerization processes disclosed herein. Chain transfer agents are often used to control polymer molecular weight. Examples of these compounds are hydrogen and metal alkyls of the general formula MxRy, where M is a Group 3-1 2 metal, x is the oxidation state of the metal, typically 1, 2, 3, 4, 5 or 6, each R is independently an alkyl or aryl, and y is 0, 1, 2, 3, 4, 5, or 6. In some embodiments, a zinc alkyl is used, such as diethyl zinc. Typical promoters may include halogenated hydrocarbons such as $CHCl_3$, $CFCl_3$, $CH_3$—$CCl_3$, $CF_2ClCCl_3$, and ethyl trichloroacetate.

Such promoters are well known to those skilled in the art and are disclosed in, for example, U.S. Pat. No. 4,988,783. Other organometallic compounds such as scavenging agents for poisons may also be used to increase catalyst activity. Examples of these compounds include metal alkyls, such as aluminum alkyls, for example, triisobutylaluminum. Some compounds may be used to neutralize static in the fluidized-bed reactor, others known as drivers rather than antistatic agents, may consistently force the static from positive to negative or from negative to positive. The use of these additives is well within the skill of those skilled in the art. These additives may be added to the circulation loops, riser, and/or downer separately or independently from the liquid catalyst if they are solids, or as part of the catalyst provided they do not interfere with the desired atomization. To be part of the bimodal catalyst system, the additives should be liquids or capable of being dissolved in the bimodal catalyst system.

A slurry or gas phase process can be operated in the presence of a metallocene-type catalyst system and in the absence of, or essentially free of, any scavengers, such as triethylaluminum, trimethylaluminum, tri-isobutylaluminum and tri-n-hexylaluminum and diethyl aluminum chloride, dibutyl zinc and the like. By "essentially free", it is meant that these compounds are not deliberately added to the reactor or any reactor components, and if present, are present to less than 1 ppm in the reactor.

As described in embodiments herein, appropriate selection of the bimodal catalyst system and ratios of the catalysts used may be used to adjust the molecular weight distribution of the HMW and LMW components of the bimodal polyethylene of the present disclosure. The HMW and LMW components can be controlled by combining catalysts with the appropriate weight average molecular weight (Mw) and co-monomer incorporation formation under the conditions of the polymerization. This may be adjusted during the formation of the bimodal catalyst, for example, by supporting two catalysts on a single support. In some embodiments, the relative amounts of the catalysts can be adjusted by adding one of the components to a polymerization catalyst and/or a catalyst mixture such as a bimodal polymerization catalyst system en-route to the reactor in a process termed "trim." Feedback of polymer property data can be used to control the amount of catalyst addition.

Employing multiple catalysts that are co-supported on a single support mixed with an activator, such as a silica methylaluminoxane (SMAO), can also provide a cost advantage by making the product in one reactor instead of multiple reactors. Further, using a single support also facilitates intimate mixing of the polymers and offers improved operability relative to preparing a mixture of polymers of different Mw and density independently from multiple catalysts in a single reactor.

The properties of the bimodal polyethylene of the present disclosure may be controlled by adjusting the timing, temperature, concentrations, and sequence of the mixing of the solution, the slurry and any optional added materials (nucleating agents, catalyst compounds, activators, etc.) described above. The molecular weight distribution, melt index, relative amount of polymer produced by each catalyst, and other properties of the polymer produced may also be changed by manipulating process parameters. Any number of process parameters may be adjusted, including manipulating hydrogen concentration in the polymerization system, changing the amount of a first catalyst in the polymerization system, and/or changing the amount of the second catalyst of the bimodal catalyst system in the polymerization system. Other process parameters that can be adjusted include changing the relative ratio of the catalysts for the bimodal catalyst systems in the polymerization process (and optionally adjusting their individual feed rates to maintain a steady or constant polymer production rate). The concentrations of reactants in the reactor can be adjusted by changing the amount of liquid or gas that is withdrawn or purged from the process, changing the amount and/or composition of a recovered liquid and/or recovered gas returned to the polymerization process, where the recovered liquid or recovered gas can be recovered from polymer discharged from the polymerization process. Further concentration parameters that can be adjusted include changing the polymerization temperature, changing the ethylene partial pressure in the polymerization process, changing the ethylene to co-monomer ratio in the polymerization process, changing the activator to transition metal ratio in the activation sequence. Time dependent parameters may be adjusted, such as changing the relative feed rates of the slurry or solution, changing the mixing time, the temperature and or degree of mixing of the slurry and the solution in-line, adding different types of activator compounds to the polymerization process, and adding oxygen or fluorobenzene or other catalyst poison to the polymerization process. Any combinations of these adjustments may be used to control the properties of the final bimodal polyethylene product.

In one embodiment, the molecular weight distribution of the bimodal polyethylene is measured at regular intervals and one of the above process parameters, such as temperature, catalyst compound feed rate, the ratios of the two or more catalysts to each other, the ratio of comonomer to monomer, the monomer partial pressure, and or hydrogen concentration, is altered to bring the composition to the desired level, if necessary. The molecular weight distribution may be measured by size exclusion chromatography (SEC), e.g., gel permeation chromatography (GPC), among other techniques.

In one embodiment, a bimodal polyethylene product property is measured in-line and in response the ratio of the catalysts being combined is altered. The product property measured can include the dynamic shear viscosity, flow index, melt index, density, molecular weight distribution, co-monomer content, and combinations thereof. In another embodiment, when the ratio of the catalyst compounds is altered, the introduction rate of the catalyst composition to the reactor, or other process parameters, is altered to maintain a desired production rate.

As mentioned herein, weight average molecular weight (Mw), number average molecular weight (Mn) and Mw/Mn are determined by using a High Temperature Gel Permeation Chromatography (Polymer Laboratories). The High Temperature Gel Permeation Chromatography is equipped with a differential refractive index detector (DRI). Three Polymer Laboratories PLgel 10 μm Mixed-B columns are used. The nominal flow rate is 1.0 mL/min, and the nominal injection volume is 300 μL. The various transfer lines, columns, and differential refractometer (the DRI detector) are contained in an oven maintained at 160° C. Solvent for the experiment is prepared by dissolving 6 grams of butylated hydroxytoluene as an antioxidant in 4 liters of Aldrich reagent grade 1, 2, 4 trichlorobenzene (TCB). The TCB mixture is then filtered through a 0.1 μm Teflon filter. The TCB is then degassed with an online degasser before entering the GPC instrument. Polymer solutions are prepared by placing dry polymer in glass vials, adding the desired amount of TCB, then heating the mixture at 160° C. with continuous shaking for about 2 hours. All quantities are measured gravimetrically. The injection concentration is from 0.5 to 2.0 mg/ml, with lower concentrations being used for higher molecular weight samples. Prior to running each sample the DRI detector is purged. Flow rate in the apparatus is then increased to 1.0 ml/minute, and the DRI is allowed to stabilize for 8 hours before injecting the first sample. The molecular weight is determined by combining universal calibration relationship with the column calibration which is performed with a series of monodispersed polystyrene (PS) standards. The MW is calculated at each elution volume with following equation:

$$\log M_X = \frac{\log(K_X/K_{PS})}{a_X + 1} + \frac{a_{PS} + 1}{a_X + 1} \log M_{PS}$$

where the variables with subscript "X" stand for the test sample while those with subscript "PS" stand for PS. In this method, $\alpha_{PS}=0.67$ and $K_{PS}=0.000175$ while $a_X$ and $K_X$ are obtained from published literature. Specifically, a/K=0.695/0.000579 for PE and 0.705/0.0002288 for PP.

The concentration, c, at each point in the chromatogram is calculated from the baseline-subtracted DRI signal, $I_{DRI}$, using the following equation: $c=K_{DRI}I_{DRI}/(dn/dc)$ where $K_{DRI}$ is a constant determined by calibrating the DRI, and (dn/dc) is the refractive index increment for the system. Specifically, dn/dc=0.109 for polyethylene.

The mass recovery is calculated from the ratio of the integrated area of the concentration chromatography over elution volume and the injection mass which is equal to the pre-determined concentration multiplied by injection loop volume.

All molecular weights are reported in g/mol unless otherwise noted. In event of conflict between the GPC-DRI procedure and the "Rapid GPC," the GPC-DRI procedure immediately above shall be used. Further details regarding methods of determining Mw, Mn, MWD are described in US 2006/0173123 page 24-25, paragraphs [0334] to [0341]. Catalyst productivity (i.e., Cat Prod) (grams polymer/gram catalyst-hour) can be determined as a ratio of an amount of polymer produce to an amount of catalyst added to the reactor. Melt temperature (i.e., Tm) can be determined via Differential Scanning Calorimetry according to ASTM D 3418-08. For instance, using a scan rate of 10° C./min on a sample of 10 mg and using the second heating cycle.

The bimodal polyethylene can be suitable for such articles as films, fibers, nonwoven and/or woven fabrics, extruded articles, and/or molded articles. Examples of films include blown or cast films formed in single layer extrusion, coextrusion, or lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications, agricultural films and sheets. Examples of fibers include melt spinning, solution spinning and melt blown fiber operations for use in woven or non-woven form to make filters, diaper fabrics, hygiene products, medical garments, geotextiles, etc. Examples of extruded articles include tubing, medical tubing, wire and cable coatings, pipe, geomembranes, and pond liners. Examples of molded articles include single and multi-layered constructions by injection molding or rotation molding or blow molding processes in the form of bottles, tanks, large hollow articles, rigid food containers and toys, etc.

All numerical values are "about" or "approximately" the indicated value, and take into account experimental error and variations that would be expected by a person having ordinary skill in the art.

EXAMPLES

Some embodiments of the present disclosure will now be described in detail in the following examples. Unless indicated otherwise, all materials used herein were acquired from Sigma Aldrich.

In the Examples, the following test procedures are used. Density was measured according to ASTM-D-1505. For melt flow ratio (MFR, ($I_{21}/I_2$)) both $I_2$ and $I_{21}$ were measured according to ASTM-1238, Condition E, at 190° C. Tensile Yield was measured according to ASTM D638-14. Flex Modulus was measured according to ASTM D790. Oxidative-Induction Time (OIT) measured using DSC which provides the measure of degradation over time in an oxygen environment at a constant temperature. Weight average molecular weight (Mw), number average molecular weight (Mn) and Mw/Mn were measured as described above in the Detailed Description. Pennsylvania notch test (PENT) was measured according to ASTM F1473-94.

Bimodal Catalyst System Preparation

The following bimodal catalyst system was used to produce the bimodal polyethylene of Example 1. Example 1 was produced using gas phase polymerization in a single-reactor system with a spray-dried catalyst system that included bis(2-pentamethylphenylamido)ethyl)amine zirconium dibenzyl together with (tetramethylcyclopentadienyl)(n-propylcyclopentadienyl)zirconium dichloride in a 3.0:1 molar ratio. Such catalyst systems are commercially available from Univation Technologies, LLC (Houston, Tex.) and sold under PRODIGY™ Bimodal Catalysts. Also fed to the reactor was a second catalyst that was prepared by mixing 69 g of (tetramethylcyclopentadienyl)(n-propylcyclopentadienyl)Zirconium dimethyl in 99.8 ml of isopentane. The second catalyst was added during the polymerization process as a catalyst trim feed to adjust the flow index properties of the bimodal polyethylene. A "dry mode" was utilized, meaning that the material was introduced in the form of dry powder (granules).

Polymerization Process

The bimodal polyethylene of Example 1 was produced in a single gas phase polymerization reactor. The gas phase reactor employed was a pilot scale continuous fluidized bed reactor with a capacity of producing 10-50 lbs per hour resin. For the experimental run, the reactor was preloaded with a seedbed of granular resin inside before startup. First the reactor with the seedbed was dried down below 5 ppm moisture with high purity nitrogen. Then the reaction gases were introduced to the reactor to build the gas phase condition. At the same time the reactor was heated up to the desired temperature. The reactor was charged with hydrogen sufficient to produce a ratio of hydrogen to ethylene of 0.006 mole ratio at the reaction conditions, and hexene to produce a ratio of hexene to ethylene of 0.011 mole ratio at reaction conditions. The reactor is pressurized with ethylene (total pressure=220 psi) and the temperature was kept at 105° C.

Once the condition was reached, the slurry catalyst was injected into the reactor. Meanwhile the other catalyst trim feed was mixed with the main catalyst stream before entering the reactor at varying molar ratios ranging from 1.5 to 2.0 ($Zr_{catayst}/Zr_{trim}$, mol/mol) to fine tune the flow index and the melt index to the target. About three bed turnovers were used to reach to steady state production of the bimodal polyethylene.

Tables 1 and 2 provide properties of Example 1 of the bimodal polyethylene and three commercially available polymer compositions. QHM 22F is a PERT Type I single reactor product available from Qilu Petrochemicals (Shandong, China). XRT-70 is a high density PERT Type II polyethylene made using Total's double loop technology and available from Total Petrochemicals & Refining S.A. Hostalen 4731B is a PERT Type II polyethylene available from LyondellBasell Industries, Rotterdam, The Netherlands.

Tests were performed at 80° C. and 2.4 MPa, and at 90° C. and 2.4 MPa. The results are shown in Table 1, above. PENT is a general method for predicting the life time of a polyethylene structure that fails by slow crack growth. Higher PENT hours indicate higher lifetime of the polyethylene pipes. As seen from Example 1 data in Table 1 the PENT at 80° C. and 90° C. are over 2000 hours, which is significantly higher than the ASTM requirement of 500 hours at 90° C. and 2.4 MPa for PE-RT pipe resins.

In addition, The FIGURE shows a molecular weight distribution (MWD) curve taken of the bimodal polyethylene (Example 1) and Comparative Examples A-C using the SEC technique described herein (GPC method). As illustrated, the curve for Example 1 reveals two peaks, one of which corresponds to a relatively low molecular weight component, the other corresponding to a high molecular weight component. In contrast, each curve for Comparative

TABLE 1

Properties of Example 1 and Comparative Examples

| Sample | Density g/cm³ | Melt Index $I_2$ | MFR $I_{21}/I_2$ | Tensile Yield MPa | Flex Modulus 2% Sec MPa | OIT @ 210° C. min. | PENT @80° C. 2.4 MPa Hrs | PENT @90° C. 2.4 MPa Hrs |
|---|---|---|---|---|---|---|---|---|
| Comparative Example A (22 F) | 0.9383 | 0.68 | 18 | 18.05 | 635 | 68.3 | 338 | 197 |
| Comparative Example B (XRT-70) | 0.948 | 0.13 | 92 | 23.12 | 856 | 79.26 | >2000 | >2000 |
| Comparative Example C (Hostalen 4731B) | 0.9482 | 0.14 | 64 | 21.4 | 850 | 74.31 | 1312 | 339 |
| Example 1 | 0.9478 | 0.24 | 70 | 25.2 | 862 | 58 | >2000 | >2000 |

TABLE 2

Molecular Weights of Example 1 and Comparative Examples

| | Mn | Mw | Mz | Mw/Mn |
|---|---|---|---|---|
| Comparative Example A (22F) | 39,815 | 134,242 | 287,230 | 3.37 |
| Comparative Example B (XRT 70) | 12,930 | 255,929 | 1,717,486 | 19.79 |
| Comparative Example C (Hostalen 4731B) | 11,555 | 245,962 | 1,478,745 | 21.29 |
| Example 1 | 8,347 | 204,720 | 1,322,827 | 24.53 |

As seen in Tables 1 and 2, the bimodal polyethylene of Example 1 displays excellent slow crack growth resistance as indicated by PENT in spite produced in a single reactor. Example 1 shows higher Mw/Mn ratio, which indicates broader molecular weight distribution resulting into better processability and higher throughput while processing into pipes.

With respect to the PENT, the test specimens of specific dimensions for Pennsylvania notch test (PENT) were prepared for the polymers of Example 1 and Comparative Examples A-C. PENT is a lab-scale screening test with small specimens to predict the resistance of slow crack growth of pipes. Samples of each of the Example 1 and Comparative Examples A-C, in pellet form, were compression molded to make plaques for PENT in accordance with the ASTM standard. From the plaques, three rectangular specimens were milled, cut and then placed onto PENT test stations.

Examples A-C illustrates one generally broad peak having a width approximately equal to the overall width of defining the two peaks of Example 1.

The GPC of Example 1 underwent deconvolution using nine Schulz-Flory distributions and assigning the lowest four to the LMW portion and the five highest to the HMW fraction. The results were as follows: Wt. % of the HMW component was equal to 59%, number average molecular weight ($Mw_n$) for the LMW component was 3,499, $Mw_n$ for the HMW component was 69,214, weight average molecular weight ($Mw_w$) for the LMW component was 9,214, and the $Mw_w$ for the HMW component was 333,144.

Short Term Hydrostatic Strength Tests of Pipes

Standardized internal pressure tests for plastic pipe are set forth in ISO 1167 entitled "Thermoplastic pipes for the conveyance of fluids—Resistance to internal pressure—Test method." The test specifies a method for determination of the resistance to constant internal pressure at constant temperature. The test requires that samples be kept in an environment at a specific temperature, which can be water ("water-in-water" test), another liquid ("water-in-liquid") or air ("water-in-air" test).

Hydrostatic testing was performed, as described in ISO 22391-2, on the bimodal polyethylene of raised temperature resistance of Example 1 following ISO 24033:2009. This test is a short-term screening hydrostatic pressure test and was conducted at three specific hydrostatic conditions. The tests were performed on 1 inch (25.4 mm) diameter SDR 11 pipes 0.12 inch (3 mm) thickness as "water-in-water" test. In terms of pipe length, the standard requires at least six times the outside diameter. In our case, the length of pipe was 18 inch (457 mm).

Pipe specimens were formed from the bimodal polyethylene of raised temperature resistance of Example 1. The pipe specimens were subjected to the three internal pressure conditions at two temperatures. Table 3 reveals the test results for short-term hydrostatic strength tests for pipe specimens made from the bimodal polyethylene of raised temperature resistance of Example 1. For all the cases, the bimodal polyethylene of raised temperature resistance of Example 1 far exceeded the failure-time criteria for PE-RT that is specified in ISO 22391-2 and ISO 24033.

TABLE 3

| Hydrostatic pipe testing | | | |
| --- | --- | --- | --- |
| Temp. °C. | Hoop Stress MPa | ISO Model requirement for ductile failure Hr | Example 1 Hours for Ductile Failure |
| 90° C. | 4.75 | 0.3 | 81.42 |
| 90° C. | 4.65 | 0.9 | 402.43 |
| 90° C. | 4.6 | 1.4 | 523.1 |
| 23° C. | 10.5 | 2 | 1121 |
| 23° C. | 10.4 | 4.5 | 2493 |
| 23° C. | 10.3 | 10.1 | 2493 |

What is claimed is:

1. A bimodal polyethylene, comprising:
a density of from 0.930 to 0.950 gram/cubic centimeters (g/ccm);
a melt index ($I_2$) of from 0.2 to 0.6 gram/10 minute;
a flow index ($I_{21}$) of 13 to 20 g/10 minutes;
a melt flow ratio ($I_{21}/I_2$) of from 20 to 75;
a polydispersity index of 12 to 30;
wherein the bimodal polyethylene includes a high weight average molecular weight (HMW) polyethylene component and a low weight average molecular weight (LMW) polyethylene component characterized in which a chromatogram of a gel permeation chromatography (GPC) of the bimodal polyethylene displays a resolved bimodal weight average molecular weight distribution with a local minimum in a range of log (molecular weight) 3.5 to 5.5 between a peak representing the BMW polyethylene component and a peak representing the LMW polyethylene component, and wherein the bimodal polyethylene is characterized by a compression molded plaque formed from the bimodal polyethylene having a Pennsylvania notch test (PENT) measurement greater than 500 hours, wherein the measurement is done in accordance with requirements of ASTM F 1473 PENT test at a stress of 2.4 MPa and a temperature of 90° C. per ASTM F2769-14.

2. The bimodal polyethylene of claim 1, wherein a ratio of a height of the peak representing the HMW polyethylene component on the chromatogram of the bimodal polyethylene to the local minimum is from 1.2 to 3.0 (height of peak for HMW polyethylene component/local minimum).

3. The bimodal polyethylene of claim 2, wherein a ratio of a height of the peak representing the LMW polyethylene component on the chromatogram of the bimodal polyethylene to the local minimum is from 1.2 to 3.0 (height of peak for LMW polyethylene component/local minimum).

4. The bimodal polyethylene of claim 3, wherein a ratio of the height of the peak representing the LMW polyethylene component on the chromatogram of the bimodal polyethylene to the height of the peak representing the HMW polyethylene component on the chromatogram of the bimodal polyethylene is from 0.5 to 2.5 (height of LMW polyethylene component/(height of HMW polyethylene component).

5. The bimodal polyethylene of claim 1, wherein the bimodal polyethylene is a reaction product of a polymerization process performed in a single reactor and that employs a bimodal polymerization catalyst system comprising:
a bimodal catalyst system of bis(2-pentamethylphenylamido)ethyl)amine Zirconium dibenzyl and either (tetramethylcyclopentadienyl)(n-propylcyclopentadienyl)Zirconium dichloride or (tetramethylcyclopentadienyl)(n-propylcyclopentadienyl)zirconium dimethyl in a 3.0:1 molar ratio; and
a trim catalyst of (tetramethylcyclopentadienyl)(n-propylcyclopentadienyl)Zirconium dimethyl in an alkane solvent added to adjust melt flow ratio of the bimodal polyethylene.

6. The bimodal polyethylene of claim 5 wherein the polymerization process is a gas phase polymerization process.

7. The bimodal polyethylene of claim 1 characterized by raised temperature resistance measured on a compression molded plaque formed from the bimodal polyethylene, wherein the measurement is done in accordance with the requirements of ASTM F 1473 PENT test at a stress of 2.4 MPa and a temperature of 90° C. as per ASTM F2769-14.

8. The bimodal polyethylene of claim 1 characterized by raised temperature resistance as a PE-RT Type II material that when evaluated in accordance with ISO 9080 or equivalent, with internal pressure tests being carried out in accordance with ISO 1167-1 and ISO 1167-2, the bimodal polyethylene conforms to the 4-parameter model given in ISO 24033 for PE-RT Type II material over a range of temperature and internal pressure as provided in ISO 22391.

9. The bimodal polyethylene of claim 1, wherein the bimodal polyethylene has a ratio of the high weight average molecular weight component ($Mw_{HMW}$) to the low weight average molecular weight component ($Mw_{LMW}$) of the bimodal polyethylene that is from 20:1 to 100:1.

10. The bimodal polyethylene of claim 1, wherein the high weight average molecular weight polyethylene component is present in an amount of 40 to 75 weight percent based on a total weight of the bimodal polyethylene.

11. The bimodal polyethylene of claim 1, wherein the low weight average molecular weight polyethylene component is present in an amount of 25 to 60 weight percent based on a total weight of the bimodal polyethylene.

12. The bimodal polyethylene of claim 1, wherein the low weight average molecular weight polyethylene component of the bimodal polyethylene has a weight average molecular weight ($M_w$) of 1,000 to 100,000.

13. The bimodal polyethylene of claim 1, wherein the high weight average molecular weight polyethylene component of the bimodal polyethylene has a weight average molecular weight ($M_w$) of 10,000 to 1,000,000.

* * * * *